Patented Aug. 12, 1952

2,606,895

UNITED STATES PATENT OFFICE 2,606,895

METHOD OF DIAZOTATING AMINOBENZENE ACID ESTERS

René Léon Lehmann, Paris, and Josef Lintner, La Garenne Colombes, France, assignors to Bozel-Maletra, Societe Industrielle de Produits Chimiques, Paris, France, a corporation of France No Drawing. Application September 23, 1948, Serial No. 50,877. In France December 20, 1947

5 Claims. (Cl. 260—141)

In order to avoid a saponification during the diazotation of esters of aminobenzoic acid, the operation is usually effected in the presence of comparatively important amounts of alcohol.

The presence of alcohol has however in many cases a detrimental action during the subsequent elaboration of the diazoted compound. For it is known that when it is attempted to decompose diazoted compounds by means of copper or copper-containing compounds the presence of alcohol usually favours the degradation of the diazonium group and gives rise to undesired secondary reactions.

Now it has been found in the laboratories of the applicant that the esters of aminobenzoic acids may be transformed, with good efficiency even in an aqueous medium, into diazoted compounds by means of nitrous acid by starting not from the esters proper but from their amine salts and by effecting the diazotation at a sufficiently low temperature (lower than 0° C.). To obtain the said low temperatures it is advantageous to introduce the practically dry salt of the ester of the aminobenzoic acid in question into an ice-acid mixture previously prepared; thus it is usually possible to obtain temperatures down to —20° C. at least. A sodium nitrite solution is then poured into the mixture while vigourously stirring; it does not matter whether the salt of the ester of the aminobenzoic acid is previously dissolved or not. The introduction of the sodium nitrite solution should take place within as short a time as possible. The temperature increase which occurs during the introduction of the nitrite solution is unimportant so long as, at the end of the addition, the mixture temperature does not exceed 0° C. The sulphuric salts of esters of aminobenzoic acids are particularly well adapted to the embodiment of the method according to the invention. In this case, however, it often occurs that some sodium sulphate precipitates out in the reaction mixture and it is sometimes desirable to remove the said sulphate by filtration or the like before proceeding to the subsequent elaboration.

By suitably selecting the original concentrations and by using sufficiently important charges it is however possible to meet the temperature conditions stated above without resorting to any additional exterior refrigeration. The method according to the invention thus makes it possible to obtain in an extremely simple manner and without resorting to special auxiliary technical means the transformation of esters of aminobenzoic acids by means of nitrous acid into diazoted compounds.

Since the operation takes place in an aqueous solution and since there is no need to use alcohol as a solvent, the method offers considerable advantages from the chemical point of view as well as from the point of view of the technical embodiment and raw materials.

Another advantage consists in that the salts of esters of aminobenzoic acids used in this method as onset materials are usually obtained in the form of a precipitate during esterification. They may then be used directly for producing solutions of diazonium salts without requiring any special purifying, after having merely removed the excess alcohol resulting from the esterification.

Example 100 parts of crushed ice are sprayed with a cold mixture of 22 parts of high concentration sulphuric acid with 10 parts of water; the mixture is given a proper homogeneity. 50 parts of methyl anthranilate sulphate are then introduced while stirring, which rapidly lowers the temperature down to about —18 to —20° C. A recently prepared solution of 15 parts of sodium nitrite in 30 parts of water is then poured into the mixture at once or within as short a time as possible. During this operation the methyl anthranilate sulphate is gradually entirely dissolved and the temperature increases progressively. The stirring is further continued for a time, in case of need the precipitated sodium sulphate is removed by wringing and the solution of diazonium thus obtained is then elaborated in the desired manner, if possible without delay.

We claim:

1. A method of diazotizing methyl esters of aminobenzoic acids, consisting in treating a sulphate of a methyl ester of an aminobenzoic acid in an aqueous solution with nitrous acid at an initial temperature between 0° C. and —20° C., the temperature being maintained below 0° C. during the entire reaction.

2. A method of diazotizing methyl esters of aminobenzoic acids, consisting in introducing a sulfate of a methyl ester of an aminobenzoic acid in a practically dry state into a mixture of ice and an acid at an initial temperature between 0° C. and —20° C., and then rapidly introducing a nitrite into said mixture while stirring vigorously, the temperature being maintained below 0° C. during the entire reaction.

3. A method of diazotizing methyl esters of aminobenzoic acids, consisting in introducing a sulfate of a methyl ester of an aminobenzoic acid in a practically dry state into a mixture of ice and sulfuric acid at an initial temperature between 0° C. and —20° C., and then rapidly introducing a nitrite into said mixture while stirring vigorously, the temperature being maintained below 0° C. during the entire reaction.

4. A method of diazotizing methyl esters of aminobenzoic acids, consisting in introducing a sulfate of a methyl ester of an aminobenzoic acid in a practically dry state into a mixture of ice and an acid at an initial temperature between 0° C. and —20° C., and then rapidly introducing sodium nitrite into said mixture while stirring vigorously, the temperature being maintained below 0° C. during the entire reaction.

5. A method of diazotizing methyl esters of aminobenzoic acids, consisting in introducing a sulfate of a methyl ester of an aminobenzoic acid in a practically dry state into a mixture of ice and sulfuric acid at an initial temperature between 0° C. and —20° C., rapidly introducing into said mixture sodium nitrite while vigorously stirring, the temperature being maintained below 0° C. during the entire reaction, and removing from the reaction mixture the sodium sulfate which precipitates out.

RENÉ LÉON LEHMANN.
JOSEF LINTNER.

REFERENCES CITED

The following references are of record in the file of this patent:

UNITED STATES PATENTS

| Number | Name | Date |
|---|---|---|
| 1,846,150 | Schnitzspahn | Feb. 23, 1932 |
| 2,106,539 | Schnitzspahn | Jan. 25, 1938 |

OTHER REFERENCES

Erdmann Ber., v. 35 (1902), pages 24–27.
Power JACS, v. 43 (1921), pages 377–381.
Schwarz Gazz. Chim. Ital. v. 64 (1934), pages 518–521.